Feb. 18, 1930. F. E. ASELTINE 1,747,413
THERMOSTATICALLY CONTROLLED VALVE
Filed March 29, 1927

Inventor
Fred E. Aseltine
By Walter W. Riedel
Attorney

Patented Feb. 18, 1930

1,747,413

UNITED STATES PATENT OFFICE

FRED E. ASELTINE, OF DAYTON, OHIO

THERMOSTATICALLY-CONTROLLED VALVE

Application filed March 29, 1927. Serial No. 179,364.

This invention relates to a temperature controlled valve and particularly to such a valve adapted to be used in a water circulating system of an automobile.

It is among the objects of the present invention to provide a simple and efficient, thermostatically controlled valve unit, that may be completely assembled and properly adjusted before being inserted into a fluid conduit.

Another object is to provide a thermostatically controlled valve in which friction is reduced to a minimum and in which any sediment, contained in the fluid passing through the valve, is substantially prevented from accumulating, such accumulation tending to obstruct the free movement of the operating parts.

Further objects and advantages of the present invention will be apparent from the following description, reference being had to the accompanying drawings wherein a preferred embodiment of one form of the present invention is clearly shown.

Figure 1:
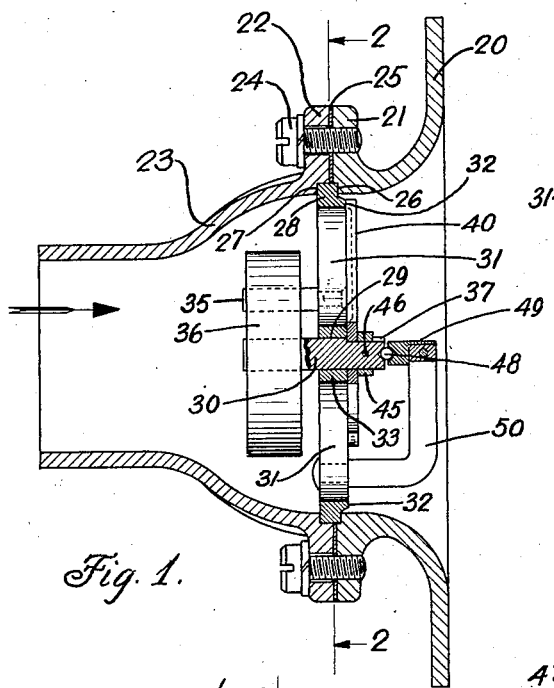
Fig. 1 is a fragmentary sectional view taken along the line 1—1 of Fig. 2, and showing the valve unit mounted in a two-part conduit.
Figure 2:
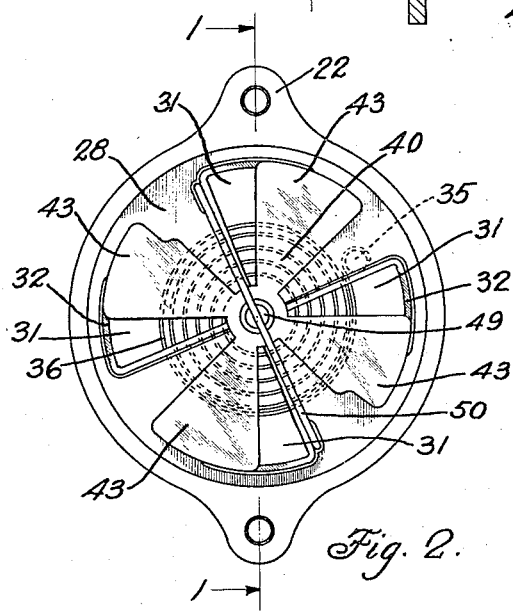
Fig. 2 is a section taken along the line 2—2 of Fig. 1, the valve being shown in half-open position.
Figure 3:
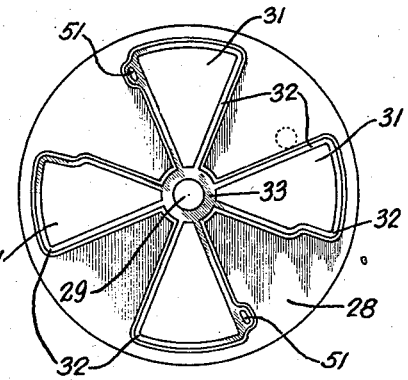
Fig. 3 is a detail plan view of the apertured disc member.
Figure 4:
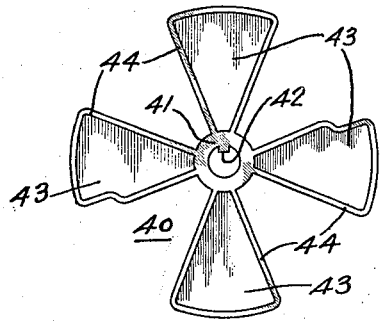
Fig. 4 is an inverted plan view of the valve plate.

Referring to the drawings, the numeral 20 designates a sleeve-like fixture, which may form a part of or be attached to the radiator of an internal combustion engine (not shown). A flange 21 provided on this fixture has screw-threaded apertures for receiving screw studs 24 which pass through apertures in the flange 22 of the hose-receiving connection 23, said studs, when tightened, clamping the two flanges 21 and 22 tightly together. The gasket 25 is placed between the two flanges to prevent a fluid leak at this point. The adjacent inner edges of the members 20 and 23 are counterbored as at 26 and 27 respectively to provide a recess within the passage formed by said members.

The valve unit comprises a disc 28, the outer edge of which fits snugly into the recess formed by the counterbores 26 and 27, clamping of the flanges 21 and 22 securely holding said disc therebetween so as to form a partition wall in the passage. An aperture 29 is provided centrally of the disc so as to be substantially coaxial with the passage. In this central aperture is journalled the shaft 30 which extends from each side of the disc. A plurality of apertures is shown to be triangular in formation with the converging sides pointing toward the center, but which may be of any suitable shape, are provided in the disc in substantially circular formation about the aperture 29. Four of these apertures 31 are shown in the present drawings; it is, however, obvious that any number of such apertures may be provided. An extension or ridge 32 is provided on the disc, about the edges of the apertures 31, said ridge blending into and being flush with the hub 33. As shown in Fig. 1, the face of the ridge is comparatively narrow, the side wall thereof sloping outwardly and toward the main body of the disc.

A post 35 is carried by the disc and extends therefrom, said post providing an anchoring means for one end of the thermostatic element 36 shown in the form of a spiral, the opposite end thereof being secured to the shaft 30. This thermostatic element will, at increasing temperatures, rotate the shaft in one direction and at a decrease in temperature the rotation is in the opposite direction. In the Fig. 1 the arrow indicates the direction of the flow of water, and it may be seen that the thermostatic element will be engaged by the water as it is being warmed up and circulated by the engine so that the increased temperature of the water will cause the thermostat to rotate the shaft to open the valve.

The portion of the shaft extending from the side of the disc opposite the thermostatic element 36, is provided with a keyway 37, the inner end of which is flush with the surface of the hub portion 33 when the shaft is properly located in said hub. An indent is provided centrally of the shaft and in the end thereof for purposes to be described.

The valve-plate of the valve unit is designated by the numeral 40 and comprises an apertured hub 41. From the hub portion a tongue 42 extends into the aperture thereof, said tongue being adapted to fit into the keyway 37 to secure the valve-plate to the shaft and cause it to rotate therewith when said valve-plate is placed in position upon said shaft. Radiating from the hub 41 are a plurality of valve blades 43, similarly shaped and spaced, and equal in number to the apertures 31 of the disc. When in one position these blades are adapted to cover and close the said apertures. A ridge 44 is provided adjacent the edge of each of said blades, said ridge being substantially equal in width to the ridge 32 of the disc and being adapted to coincide with and substantially engage said ridge 32 when the valve plate is in the aperture closing position. To maintain the valve-plate in proper position on the shaft, a collar 45 is placed thereupon and secured thereto by a pin 46, said collar engaging the outer surface of the valve hub 41.

The indent in the end of the shaft forms one seat for the ball, end-thrust bearing 48, the other seat for this bearing being provided by an indent in the block 49 which is supported by the bridging member 50. This member 50 has two leg portions, whose ends are reduced so as to provide shoulders which rest against the disc when the reduced end portions are inserted into the openings 51 in the disc. The ends of these leg portions are riveted over the opposite side of the disc, thereby securely fastening the bridging member to said disc. The legs of the bridging member lie in the path of movement of the rotatable valve-plate 40, and are so positioned on the disc that they will act as stops for said valve-plate, to limit the movement thereof in either direction. When rotated in the closing direction, one side of the valve-plate will engage the legs so that the blades thereof will be maintained in the proper aperture closing position. This will prevent further movement thereof by the thermostat when the temperature of the water drops below a predetermined limit. When rotating in the opposite direction, the legs will prevent the valve-plate from passing beyond a full open position, thereby preventing said valve-plate to be rotated again to close the apertures by a continuous movement in this same direction. The block 49 is so adjusted on the bridging member that a clearance of substantially one or two-thousandths of an inch is provided between the valve-plate and the disc. This clearance provides for leakage past the valve while it is still closed, permitting a limited circulation of water by the engine while it is warming up.

Figure 5:
Fig. 5 is a plan view of a modified form of the bridging member which supports the end-thrust bearing.
Figure 6:
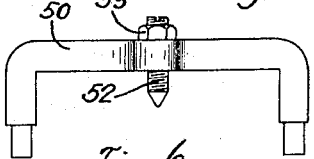
Fig. 6 is a side view of the member shown in Fig. 5.

In the Figs. 5 and 6, which show modified forms of the bridging member 50, said member is provided with a central hub portion $50^a$, having a screw-threaded aperture for receiving the adjustable end-thrust bearing screw 52. The inner end of this screw is pointed so that its engagement with the end of the shaft 30 is substantially frictionless. The nut 53 is provided on said screw and may be loosened to permit adjustment of the screw so that it will maintain the valve plate in proper relative position with the disc.

The ridges 32 and 44 provided respectively on the disc and valve blades, offer minimum cooperative surfaces between these members and thereby reduce friction therebetween to a substantial minimum. Ordinarily friction may be caused by accumulation upon the surfaces of the ridges. This type of structure however substantially eliminates the accumulation of any silt or sediment that may be contained in the fluid passing through the valves, and which by accumulating between the valve and disc, will tend to prevent free movement of the operating parts.

In the accompanying drawings the valve is illustrated as having four fluid passages which are fully open when the temperature of the valve reaches a proper degree. With four apertures in the disc, the valve plate must necessarily rotate through 45 degrees to fully open the valve. To obtain this movement within a predetermined range of temperature variations, it has been found that a thermostatic element of a predetermined length must be provided. In order to provide for compactness, the element is wound in the form of a spiral.

One advantage of the present invention resides in the fact that by increasing the number of fluid passages and therefore necessarily increasing the number of valve blades, the degree of movement to fully open said valve is substantially reduced, consequently a reduction in the length of the thermostatic element obtains. However when it is desired to provide a valve which will be opened fully within a comparatively small range of temperature variations, or which will be operated substantially positively regardless of the conditions of the water as to its cleanliness, the number of water passages in the valve may be increased as mentioned above, to decrease the necessary degree of movement for full opening thereof. To assure this substantially positive movement under the last mentioned condition, the thermostatic element may be of a size as is used in connection with a valve having a lesser number of water passages and a greater degree of travel, said thermostatic element thus providing a sustained and greater force to meet the requirements.

It will be seen that the valve may be assembled and adjusted before it is inserted into the water conduit, thus greatly facilitating the commercial production thereof for varying designs of engines having however the same temperature characteristics.

While the form of embodiment of the present invention as herein disclosed, constitutes a preferred form, it is to be understood that other forms might be adopted, all coming within the scope of the claims which follow.

What is claimed is as follows:

1. A unitary device of the character described, comprising in combination, an apertured disc; a shaft rotatably supported by said disc; a valve-plate secured to said shaft, on one side of the disc, and providing a cover for the aperture therein; a thermostatic element mounted upon the other side of the disc and operably connected to rotate the shaft upon variation in temperature; and a substantially frictionless bearing member supported on the disc and engaging the end of the shaft beyond said valve plate to hold the valve-plate in engagement with the disc.

2. A device of the character described, comprising in combination, an apertured disc; a shaft rotatably supported by said disc; a valve-plate secured to said shaft on one side of the disc, and providing a cover for the aperture therein; a thermostatic element mounted on the other side of the disc and connected to the shaft; a bridging member mounted on the disc and providing a stop normally holding the valve-plate in aperture closing position; and an end-thrust bearing supported by said member and engaging the end of the shaft to maintain the valve-plate in disc engaging position.

3. A device of the character described, comprising in combination, an apertured disc; a shaft rotatably supported by said disc; a valve-plate secured to said shaft on one side of the disc, and providing a cover for the aperture therein; a thermostatic element mounted on the other side of the disc and connected to the shaft; a bridging member mounted on the disc and providing a stop normally holding the valve-plate in aperture closing position; and an adjustable, substantially frictionless end-thrust bearing carried by said member and engaging the end of the shaft to maintain the valve-plate in disc engaging position.

4. A device of the character described, comprising in combination, a disc having a central aperture and a plurality of apertures arranged about said central aperture in substantially circular formation; a ridge provided on said disc about the edges of the apertures therein; a shaft journalled in the central aperture of the disc; a valve-plate secured to said shaft, said valve plate comprising a hub portion and blades equal in number to the apertures in the disc; a ridge formed adjacent the edges of the valve blades and adapted to coincide with and engage the ridge provided on the disc when the valve-plate is in normal aperture closing position; a thermostatic member in the form of a spiral spring having one end secured to the disc, the other end being fastened to the shaft, said member actuating the shaft to valve-plate closing position at proper low temperatures and operating said shaft to valve-opening position at proper, higher temperatures; a bridging member secured to the disc and adapted to stop the valve-plate in aperture closing position when operated in the one direction; and an end-thrust bearing on said member for maintaining the valve-plate in disc engaging position.

5. A device of the character described, comprising in combination, a disc having apertures provided about a central hub portion, said apertures being surrounded by comparatively narrow ridges formed on the disc, said ridges blending into and being substantially flush with the one surface of the hub portion of said disc, a shaft rotatably supported in a passage formed in the hub of the disc, a shutter carried by the shaft and having sliding contact with the face of the ridges on the disc and a thermostatic member in the form of a spiral spring having one end secured to the shaft, and the other end anchored to the disc, whereby to control the position of said shutter according to the temperature.

6. A unitary thermostat device adapted to be inserted as a unit in a preadjusted condition in a duct to control the flow therethrough according to temperature conditions, said device comprising: a disc having valve openings therein and adapted to be fixed within said duct, a shaft mounted in an aperture in said disc, a valve shutter fixed to said shaft and having sliding contact with one face of said disc and adapted to control the valve openings therein, an end thrust bearing engaging the end of the shaft to maintain the valve shutter in sliding engagement with the disc, a bearing supporting member on said disc, and a thermostat element mounted upon the opposite face of said disc and operably connected to rotate said shaft upon variation in temperature.

In testimony whereof I hereto affix my signature.

FRED E. ASELTINE.